United States Patent [19]
Kimoto et al.

[11] Patent Number: 4,870,562
[45] Date of Patent: Sep. 26, 1989

[54] MICROCOMPUTER CAPABLE OF ACCESSING INTERNAL MEMORY AT A DESIRED VARIABLE ACCESS TIME

[75] Inventors: Manabu Kimoto; Yukihiro Nishiguchi, both of Tokyo, Japan

[73] Assignee: NEC Corporation, Tokyo, Japan

[21] Appl. No.: 28,513

[22] Filed: Mar. 20, 1987

[30] Foreign Application Priority Data

Mar. 20, 1986 [JP] Japan ................................. 61-64348

[51] Int. Cl.⁴ ...................... G06F 13/16; G06F 13/18
[52] U.S. Cl. ............................ 364/200; 364/243.2; 364/270.2; 364/271.6
[58] Field of Search ................... 364/200, 900, 569

[56] References Cited

U.S. PATENT DOCUMENTS

| 3,962,683 | 6/1976 | Brown et al. | 364/200 |
| 4,093,982 | 6/1978 | Heuer et al. | 364/200 |
| 4,168,526 | 9/1979 | Auer, Jr. et al. | 364/569 |
| 4,397,031 | 8/1983 | Weber | 364/569 X |
| 4,447,870 | 5/1984 | Tague et al. | 364/200 |
| 4,602,347 | 7/1986 | Koyama | 364/569 |
| 4,665,483 | 5/1987 | Ciacci et al. | 364/200 |

Primary Examiner—Felix D. Gruber
Attorney, Agent, or Firm—Sughrue, Mion, Zinn, Macpeak & Seas

[57] ABSTRACT

A microcomputer includes an instruction execution unit and an internal memory formed on the same chip. A first circuit is provided for setting a memory access cycle for a read/write to the internal memory shorter than that for read/write to an external memory. Further, a second circuit is provided for setting the memory access cycle for the read/write to the internal memory substantially equal to that for the read/write to the external memory. The first and second setting circuits are alternatively and selectively activated.

11 Claims, 7 Drawing Sheets

MICROCOMPUTER CAPABLE OF ACCESSING INTERNAL MEMORY AT A DESIRED VARIABLE ACCESS TIME

BACKGROUND OF THE INVENTION

1. Field of the Invention

The present invention relates to a microcomputer, and more particularly to a microcomputer having an instruction execution unit and an internal memory formed on the same chip and capable of accessing the internal memory and an external memory.

2. Description of Related Art

Recent advancement of semiconductor device manufacturing technologies has resulted in increase in the integration density of semiconductor devices. This advancement has developed so-called microcomputers from 8 bits to 16 bits, and further to 32 bits. Particularly, increased integration density of the microcomputer has increased the capacity of an internal memory formed together with an instruction execution unit on the same single chip.

On the other hand, the advancement of the semiconductor device manufacturing technologies has also elevated the operation speed of the semiconductor devices. Particularly, the internal memory can be operated at a speed higher than that required for accessing to an external memory, because the internal memory can be accessed without intermediary of an external bus and a bus buffer.

Thus, in order to improve the performance of microcomputers, it has become an ordinary practice to positively utilize an internal memory and set a read/write cycle in such a manner that an internal memory access time is shorter than an external memory access time. For this purpose, for example, a microcomputer is constructed such that an internal bus of the microcomputers is divided into a main bus for transferring data and address to an external memory access, and a sub-bus specially provided for accessing an internal memory, so that an internal memory access can be executed in a short time.

In an instruction execution of microcomputers, however, the memory access time is closely related to the actual time of the instruction execution. Therefore, in the computer constructed as mentioned above, the processing time the execution of instructions with reference to the internal memory is different from the time for the execution of instructions with reference to the external memory. This is true even if the contents of the processings are the same.

On the other hand, in the case of a microcomputer having an internal memory composed of a mask programmable read only memory (ROM), when only a small amount of microcomputers is produced, the system is so constructed that only an external memory is used from the viewpoint of the cost and reliability of the processing program. But, if the computer becomes manufactured in a mass-production manner, a processing program is then relocated to an internal memory to allow reduction of required capacity of an external memory, so that the cost is decreased.

In this circumstance, it is inconvenient that the processing with reference to the internal memory is different in execution time from the processing with reference to the external memory. Particularly, this problem is very significant in the field of application such as a motor control in which a real time processing has to be precisely executed.

SUMMARY OF THE INVENTION

Accordingly, it is an object of the present invention to provide a microcomputer which includes an instruction execution unit and an internal memory formed on the same single chip, and which can effectively utilize the internal memory allowing a rapid access, while ensuring an internal memory access in the same operation time as that of an external memory access if necessary.

Another object of the present invention is to provide a microcomputer which has an instruction execution unit and an internal memory formed on the same single chip and which can access the internal memory not only at an access time shorter than a time of access to an external memory but also at another access time substantially equal to the time of access to the external memory.

Still another object of the present invention is to provide a microcomputer having an instruction execution unit and an internal memory formed on the same single chip, which has two access times for the internal memory and which can select one of the two access times when the internal memory is accessed.

The above and other objects of the present invention are achieved in accordance with the present invention by a microcomputer which includes an instruction execution unit and an internal memory formed on the same chip, comprising a first means for setting a memory access cycle for a read/write to the internal memory shorter than that for read/write to an external memory, a second means for setting the memory access cycle for the read/write to the internal memory substantially equal to that for the read/write to the external memory, and means for selectively activating one of the first and second setting means.

The above and other objects, features and advantages of the present invention will be apparent from the following description of preferred embodiments of the invention with reference to the accompanying drawings.

DESCRIPTION OF THE PREFERRED EMBODIMENTS

Figure 1:
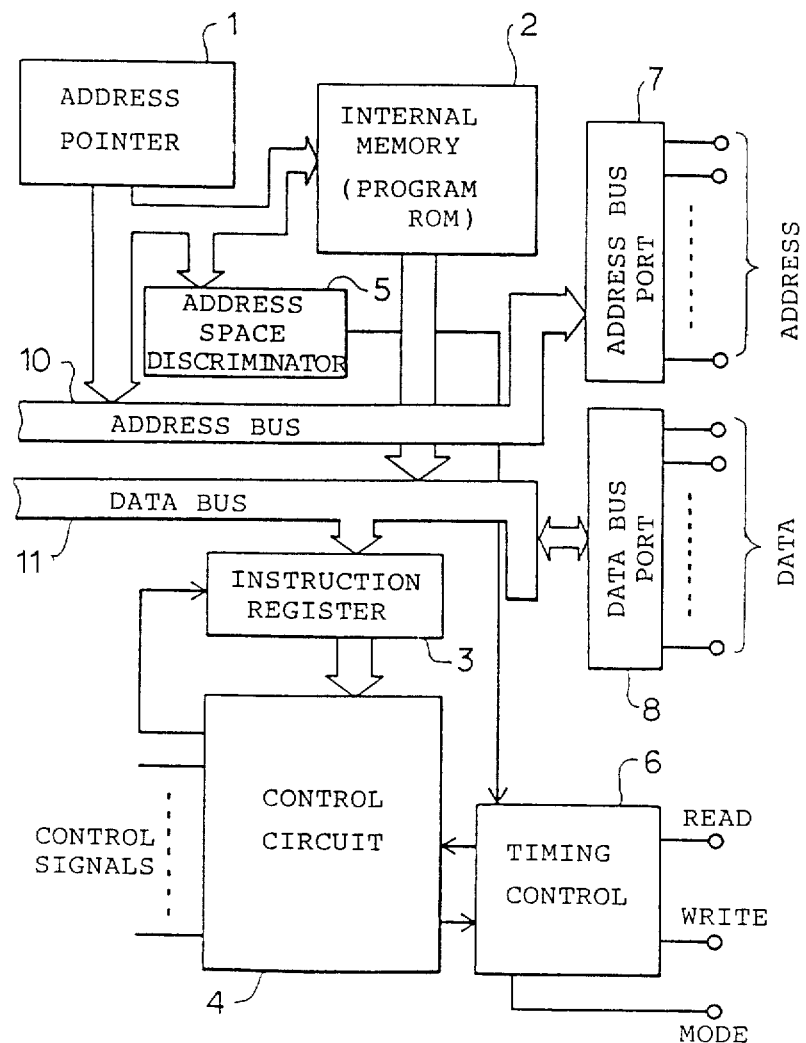
FIG. 1 is a block diagram showing a memory access control section of a first embodiment of the microcomputer in accordance with the present invention.

Referring to FIG. 1, there is shown a block diagram of a memory access control section of a one-chip microcomputer constructed in accordance with the present invention. The shown memory access control section includes an address pointer 1 which indicates the address of a memory to which the microcomputer should access. The address pointer 1 is directly coupled to an internal memory 2 such as a program memory which stores a sequence of instructions in the form of a machine language. The address pointer 1 is also coupled to an address space discriminator 5 which generates an address discrimination signal indicating whether the internal memory 2 or an external memory (not shown) is designated by the address pointer 1.

If the address space discriminator 5 judges that the internal memory 2 is designated by the address pointer 1, an address is read from the address pointer 1 to an address bus 10, and at the same time, data is read from the internal memory 2 to a data bus 11, and then fed to an instruction register 3. In this embodiment, as mentioned above the data read from the internal memory 2 is an instruction in the form of an machine language. The instruction held in the register 3 is fed to a control circuit 4, which in turn responds to the given instruction to generate various control signals for instruction execution. On of the control signals is fed to a timing controller 6 which controls the timing of a memory access.

On the other hand, if the address space discriminator 5 judges that the external memory is designated by the address pointer 1, the address read from the address pointer 1 is fed through the address bus 10 and an address bus port 7 to the external memory, and data is transferred through the data bus 11 and a data bus port 8 to or from the external memory. In addition, the read/write of the external memory is controlled by a read signal and a write signal generated by the timing controller 6.

For the memory access operations as mentioned above as well as an internal memory access at an access time comparable to that for the external memory access, a mode setting signal is fed to the timing controller 6 which receives the address discrimination signal from the address space discriminator 5, and the control signal from the controller 4.

Figure 2:
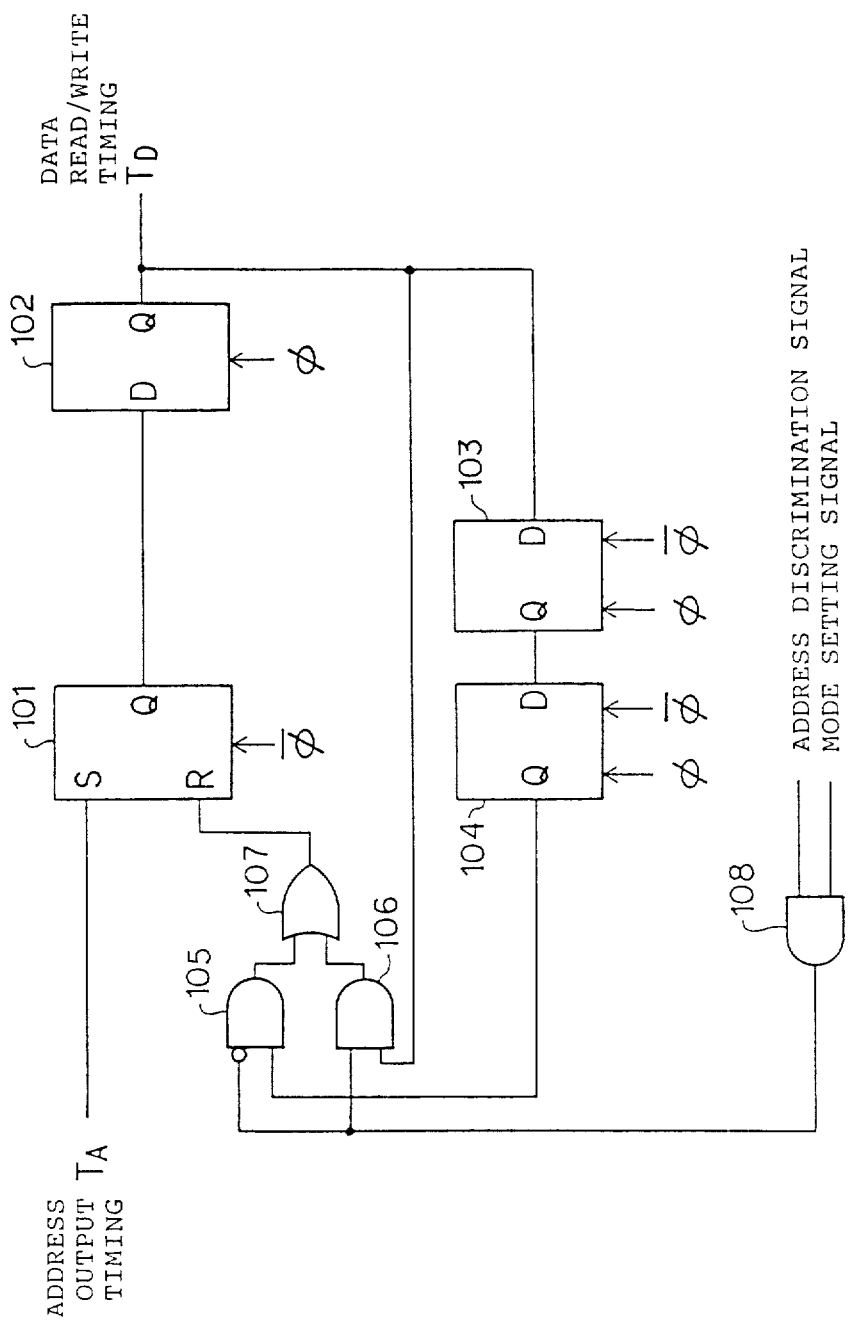
FIG. 2 is a circuit diagram of the timing controller used in the memory access control section shown in FIG. 1.

Turning to FIG. 2, there is shown a logic circuit of the timing controller 6. The timing controller 6 includes a set-reset latch (SR flip-flop) 101 having a set input S connected to receive an address output timing signal $T_A$, and adapted to be driven by a clock $\bar{\phi}$ in opposite phase to the clock $\phi$. A Q output of the latch 101 is connected to a D input of a data latch (D flip-flop) 102 driven by a clock $\phi$. A Q output of the data latch 102 provides a data read/write timing signal $T_D$, which is connected to a pair of D flip-flop 103 and 104 connected in cascade to constitute a delay circuit. These D flip-flops are driven by the pair of clocks $\phi$ and $\bar{\phi}$. A Q output of the second stage D flip-flop 104 is connected to a first input of an AND gate 105. Further, the Q output of the data latch 102 is connected to a first input of another AND gate 106. Outputs of these AND gates 105 and 106 are connected to an OR gate 107, whose output is connected to a reset input R of the SR latch 101. Furthermore, the timing controller 6 includes a third AND gate 108 having a pair of inputs connected to receive the address discrimination signal and the mode setting signal, respectively. An output of this AND gate 108 is connected to the second input of the AND gate 106, and the inverted second input of the AND Gate 105.

Figure 3:
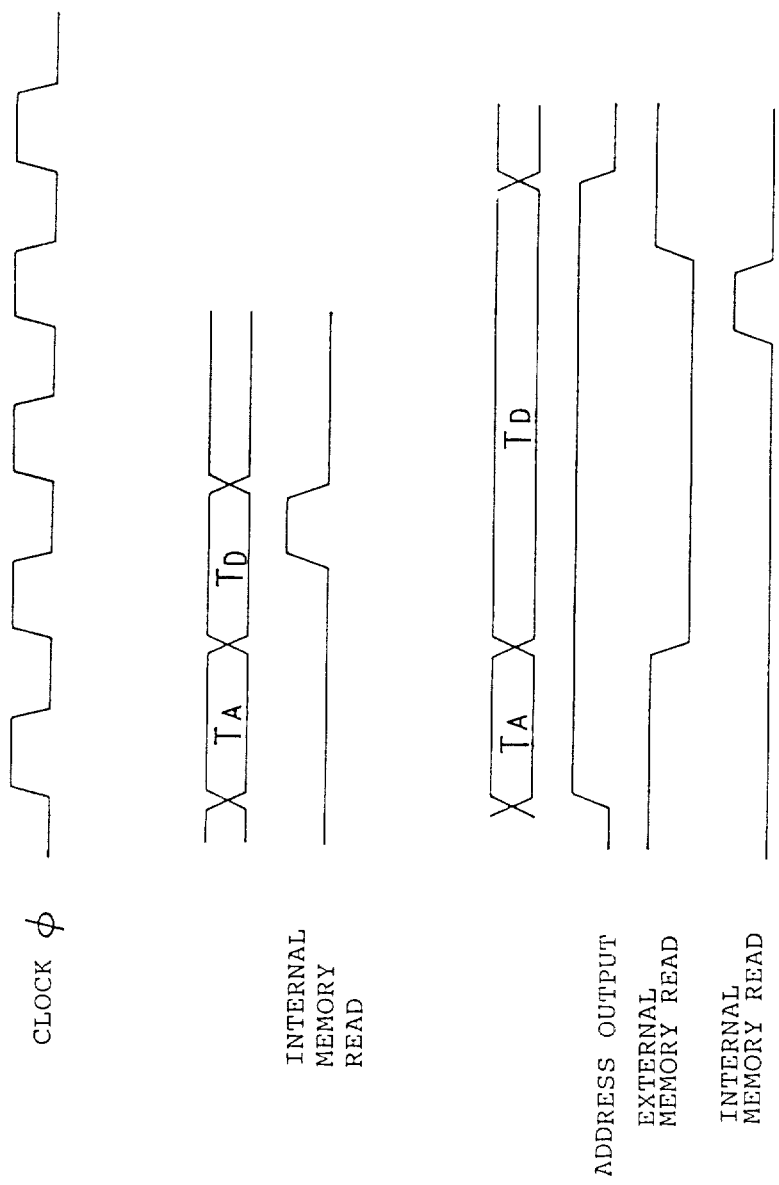
FIG. 3 is a timing chart illustrating the memory access timing in the computer shown in FIG. 1.

Next, operation will be explained with reference to FIG. 3 illustrating a memory access timing of the computer shown in FIG. 1 and having the timing controller shown in FIG. 2.

Assume that the mode setting signal of the logical value "1" means an ordinary condition in which the internal memory access can be executed for an access time shorter than that in the external memory access. Also, assume that the address space discriminator 5 generates the address discrimination signal of "1" when the address pointer 1 designates the internal memory.

Therefore, when the mode setting signal is of "1", if the address discrimination signal of "1" is supplied to the timing controller 6, specifically to the AND gate 108, the AND gate 108 generates a signal of the logical value "1". The signal of "1" is inverted to the second input of the AND gate 105, and therefore, the AND gate 105 ceaselessly outputs a signal of "0" irrespectively of the logical value supplied to the first input of the AND gate 105. But, the signal of "1" is supplied without inversion to the second input of the AND gate 106, the output of the data latch 102 supplied to the first input of the AND gate 106 is outputted as it is to the OR gate 107. As mentioned above, since the output of the AND gate 105 is of "0", the output of the data latch 102 passes through the OR gate 107 and is applied to the reset input R of the SR latch 101.

Thus, the address output timing signal $T_A$ of a logical value "1" will set the SR latch 101 in response to the clock $\bar{\phi}$, so that the latch 101 generates a signal of "1" to the data latch 102. Therefore, the data latch 102 is set in response to the clock $\phi$ just after the clock $\bar{\phi}$ which has set the SR latch 101. As a result, the data latch 102 outputs the data read/write timing signal $T_D$, which is fed back through the AND gate 106 and the OR gate 107 to the reset input R of the SR latch 101. Thus, SR latch 101 is reset in clock $\bar{\phi}$ next to the clock $\phi$ which has set the SR latch 101. Accordingly, the Q output of the data latch 102 is brought into the logical value "0" at the next clock $\phi$.

As seen from the above, in the case that the address pointer 1 designates the internal memory 2 in the ordinary condition, the data read/write timing signal $T_D$ is terminated at only one clock, and the internal memory read signal is generated at a later half of the data read/write timing signal $T_D$ having only one clock length.

On the other hand, when the address pointer 1 designates an external memory, the discriminator 5 outputs the address discrimination signal of the logical value "0". Therefore, the AND gate 108 generates a signal of "0", which is inverted and then inputted to the second input of the AND gate 105. Accordingly, the signal supplied to the first input of the AND gate 105 is outputted as it is to the OR gate 107. In other words, the data read/write timing signal $T_D$ of the data latch 102 delayed by the D flip-flops 103 and 104 is inputted to the OR gate 107. But, the signal of "0" is inputted from the AND gate 108 to the AND gate 106, the AND gate 106 ceaselessly generates a signal of "0" to the OR gate 107 irrespectively of the logical value of the signal supplied to the first input of the AND gate 106. Thus, the OR gate 107 supplies the reset input R of the SR latch 101 with the delayed data read/write timing signal.

As mentioned above, since the two D flip-flops 103 and 104 are connected in cascade between the Q output of the data latch 102 and the AND gate 106, the data read/write timing signal $T_D$ is expanded to have a length of three clocks, in which another control circuit (not shown) activates the address bus port 7, the data bus port 8 and the read/write signal for accessing the external memory. In this case, the external memory read signal is generated at a last half cycle in the timing signal $T_D$ having the length of three clocks.

In the case that the mode setting signal assumes the logical value "0" which indicates that the internal memory access should be executed for an access time substantially equal to that in the external memory access, the AND gate 108 generates a signal of "0" irrespectively of the address discrimination signal indicates the internal memory or the external memory. Therefore, in this case, the data read/write timing signal $T_D$ is expanded to have a length of three clocks, similarly to the operation when the mode setting signal is of "1" and the address discrimination signal is of "0" (the external memory access). In other words, when the mode setting signal is of "0", the internal memory access can be executed at a timing similar to that for the external memory access.

In the above mentioned embodiment, the mode setting signal is given in the form of an independent signal, but can be introduced from an output signal of a mode register produced by the microcomputer.

Figure 4:
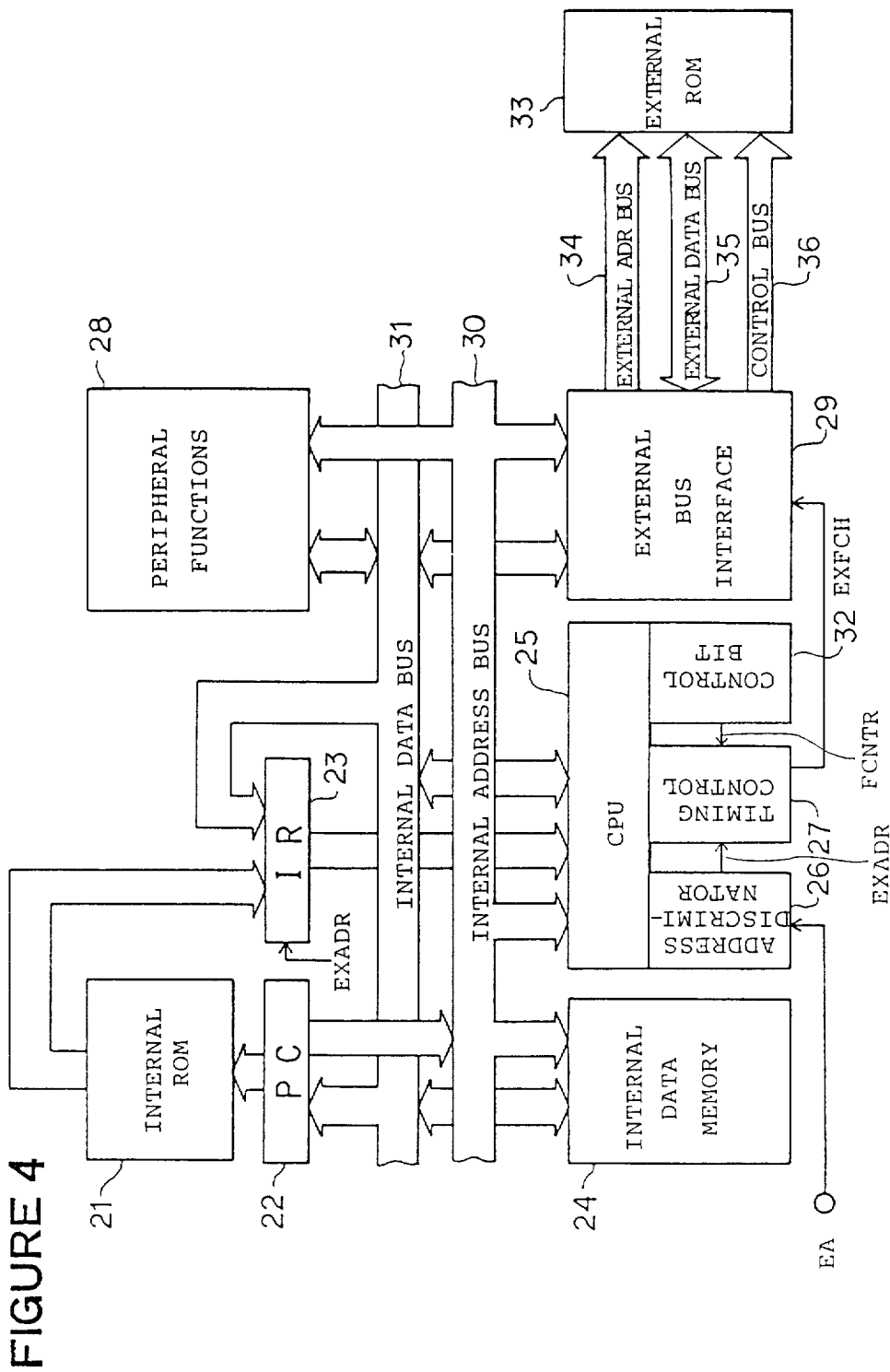
FIG. 4 is a block diagram of a second embodiment of the microcomputer in accordance with the present invention.

Referring to FIG. 4, there is shown a block diagram of a second embodiment of the one-chip microcomputer in accordance with the present invention. The shown computer comprises an internal ROM 21 storing a plurality of program sequences. A program counter (PC) 22 is associated to the internal program ROM 21 so as to designate an address of the ROM 21 to be read. This program counter 22 is incremented by +1 under control of a central processing unit (CPU) 25 at each time an instruction is executed. But, when an instruction is fetched from an external ROM 33, the content of the program counter 22 is outputted to an internal address bus 30 having for example a capacity of 16 bits, and further transferred by an external bus interface 29 through an external address bus 34 to the external ROM 33.

Further, there is provided an instruction register (IR) 23 which is coupled to the internal ROM 21 and an internal data bus 31 having a capacity of 8 bits. The instruction register 23 is controlled by an external memory space discrimination signal EXADR so as to selectively hold an instruction code fetched from the internal ROM 21 or an instruction code fetched from the external ROM 33 and then transferred from the internal data bus 30 through an external data bus 35, the external bus interface 29. In this embodiment, the EXADR signal of the logic value "0" indicates the selection of the internal ROM 21, and the EXADR signal of the logic value "1" designates the selection of the internal data bus 31.

The instruction register 23 is also coupled to the CPU 25, where the instruction code held in the instruction register 23 is decoded. In accordance with the decoded instruction, the CPU 25 executes a required operation between data of an internal data memory 24, data of a peripheral function 28, and data of an external data memory 33 while transferring these data through the internal address bus 30, the internal data bus and the external bus interface 29.

The CPU 25 is associated with an address discriminator 26 which generates the above mentioned EXADR signal. This address discriminator 26 inspects the address on the internal address bus 30, and generates the EXADR signal of "1" when the current address information on the internal address bus designates an external address space to the single chip microcomputer. Further, the address discriminator 26 receives an EA signal for invalidating the address read from the internal ROM 21. When the EA signal is of "1", the address discriminator 26 generates the EXADR signal of "1". On the other hand, when the EA signal is of "0" and when the address on the internal address bus 30 designates an address space in the internal ROM 21, the discriminator 26 generates the EXADR signal of "0".

This EXADR signal is fed not only to the instruction register 23 but also to a timing controller 27. When the EXADR signal is of "0", the timing controller 27 does not perform a special control, because an instruction is then fetched from the internal ROM 21. But, when the EXADR signal is of "1", the timing controller 27 generates an external memory fetch signal EXFCH of "1" to the external bus interface 29, and cooperates with a control bit generator 32 to cause a cycle for fetching an instruction from the external ROM 33 (this is called "external fetch cycle" hereinafter). Therefore, in response to the EXFCH signal of "1", the external bus interface 29 performs an operation for fetching an instruction from the external ROM 33. Therefore, the content of the internal address bus 30 is outputted through the external address bus 34 to the external ROM 33, and an instruction code is read out from the external ROM 33 in synchronism with a read signal included in a control signal which is fed through a control bus 36 to the external ROM 33. The instruction code thus read is transferred through the external data bus 35 and the internal data bus 31 and inputted to the instruction register 23.

Figure 5:
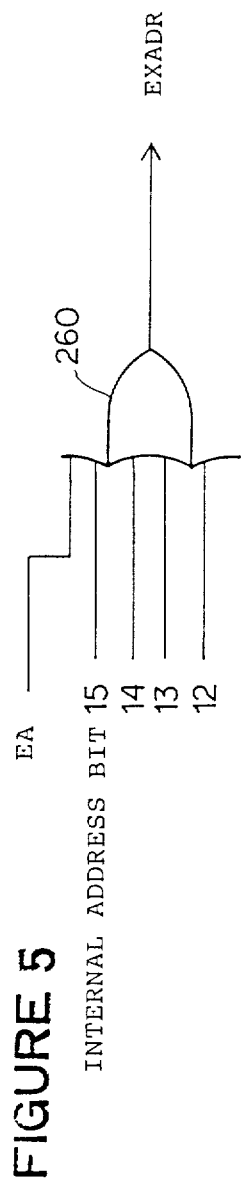
FIG. 5 is a circuit diagram of the address discriminating circuit of the microcomputer shown in FIG. 4.

Referring to FIG. 5, there is shown one example of the address discriminator 26. As seen from FIG. 5, the address discriminator 26 can be constructed of an OR circuit 260 which receives the EA signal and the most significant four bits (bit Nos. 12, 13, 14 and 15) of the 16-bit internal address on the bus 30. This arrangement is based on the condition that when the internal ROM 21 is designated, all the most significant four bits of the 16-bit address information are made "0". Therefore, the OR circuit 260 outputs the EXADR signal of "1" when the EA signal of "1" is inputted or when any one of the most significant four bits (12-15) of the address information is provided.

Figure 6:
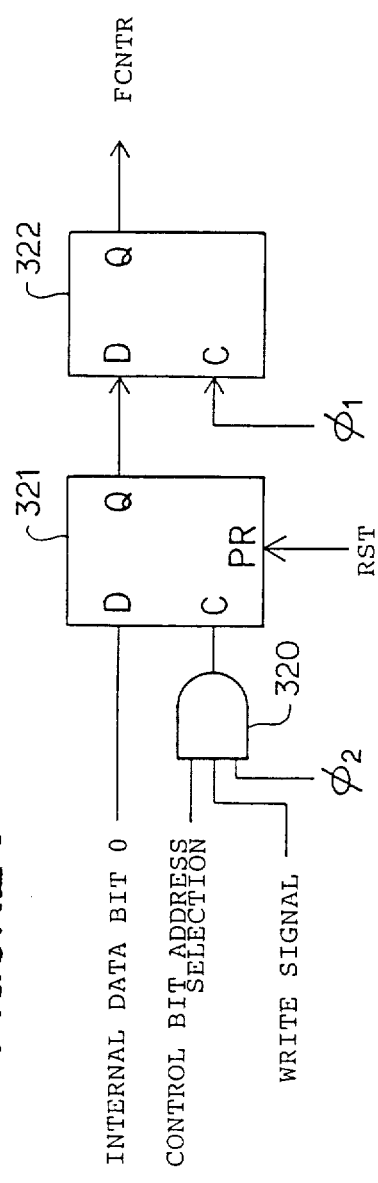
FIG. 6 is a circuit diagram of the control bit generator of the microcomputer shown in FIG. 4.

Turning to FIG. 6, the control bit generator 32 includes a pair of D latches 321 and 322 connected in cascade. The first D latch 321 has a D input adapted to receive the least significant bit of the 8-bit internal data on the bus 31. This D latch 321 is preset by a reset signal RST to generate a Q output of "1" in an initial condition. The Q output of the first D latch 321 is connected to a D input of the second D latch 322, whose Q output generates a control bit FCNTR. This second D latch 322 is driven by a clock $\phi_1$, but the first D latch 321 is driven by an output of an AND gate 320, which receives a control bit address selection signal from the CPU 25, a write signal and a clock $\phi_2$. Thus, when the CPU 25 supplies the control bit address selection signal of "1", the content of the 0th bit (the LSB bit) on the internal data bus 31 is written to the D latch 321 in synchronism with the clock $\phi_2$ in the clock cycle during which the write signal is generated. The content of the 0th data bit is written to the D latch 322 in response to the rising edge of the succeeding clock $\phi_1$, so that the FCNTR signal is set.

Figure 7:
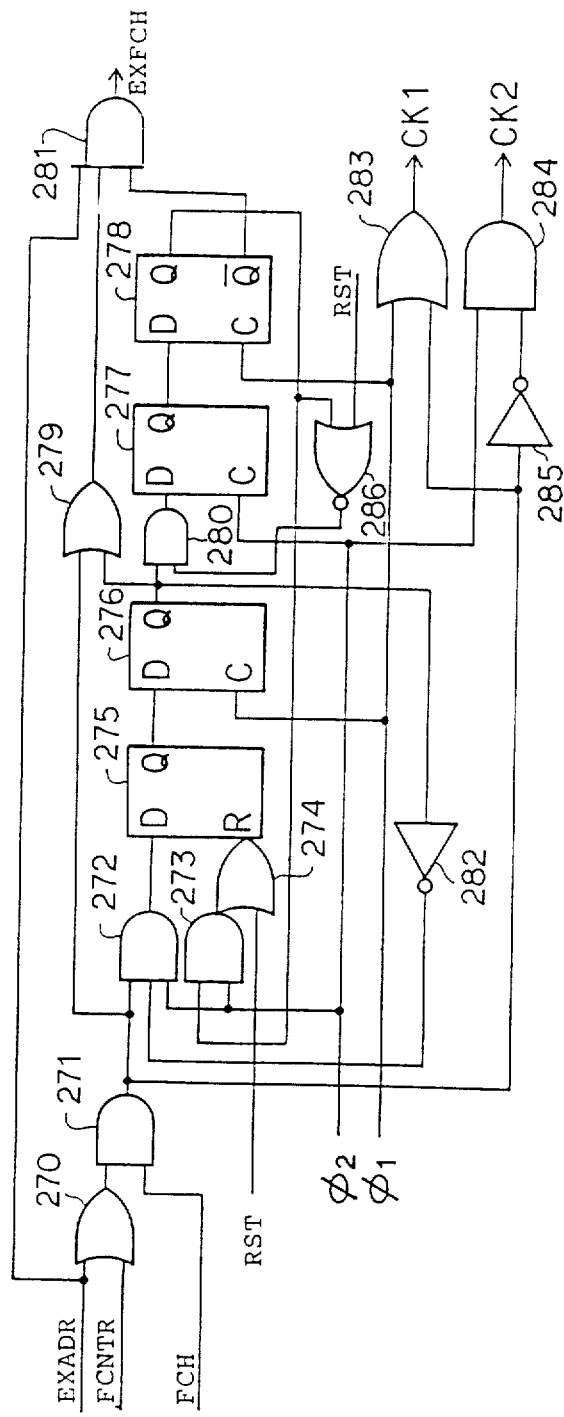
FIG. 7 is a circuit diagram of the timing controller of the computer shown in FIG. 4.

Referring to FIG. 7, there is shown a circuit diagram of the timing controller 27, which includes an OR gate 270 receiving the EXADR signal and the FCNTR signal. An output of the OR gate 270 is connected to one input of an AND circuit 271, whose other input is connected to receive an instruction fetch control signal FCH from the CPU 25. The AND gate 271 is connected at its output to one input of a three input AND circuit 272, whose output is connected to a set input S of a SR latch 275. A Q output of the latch 275 is connected to a D input of a D latch 276, whose Q output is connected to one input of an AND circuit 280. This AND circuit 280 is in turn connected at its output to a D input of another D latch 277. This D latch 277 is connected at its Q output to a D input of a third D latch 278, whose $\overline{Q}$ output is connected to a three-input AND circuit 281. This AND circuit 281 generates the EXFCH signal.

Further, the EXADR signal is supplied to the AND circuit 281. The output of the AND gate 271 is connected to one input of an OR circuit 279, whose other input is connected to the Q output of the D latch 276. An output of the OR circuit 279 is connected to the output AND circuit 281.

In addition, a Q output of the D latch 278 is connected to one input of an AND circuit 273, whose output is connected to one input of an OR circuit 274. This OR circuit 274 is connected at its output to a reset input R of the SR latch 275, and is connected at its other input to receive the reset signal RST. The Q output of the D latch 278 is also connected to one input of an NOR circuit 286, which is in turn connected at its other input to receive the reset signal RST and at its output to a clock input C of the D latch 277.

Furthermore, the Q output of the D latch 276 is connected through an inverter 282 to the AND circuit 272. In addition, a first clock $\phi_1$ is supplied to the clock inputs C of the D latches 276 and 278 and to one input of an OR circuit 283. This OR circuit 283 is connected at its other input to the output of the AND gate 271, and generates at its output a first CPU clock CK1. A second clock $\phi_2$ is supplied to the AND circuits 272 and 273, the clock input C of the D latch 277 and one input of an AND circuit 284. This AND circuit 284 receives at its other input the output of the AND circuit 271 through an inverter 285. This AND circuit 284 generates a second CPU clock CK2.

In the timing controller 27 as mentioned above, the contents of the latches 275, 276, 277 and 278 are put to "0" in an initial condition by the reset signal RST. The two-phase CPU clocks CK1 and CK2 are in synchronism with the clocks $\phi_1$ and $\phi_2$, respectively, and the CPU is operated by the CPU clocks CK1 and CK2.

Figure 8:
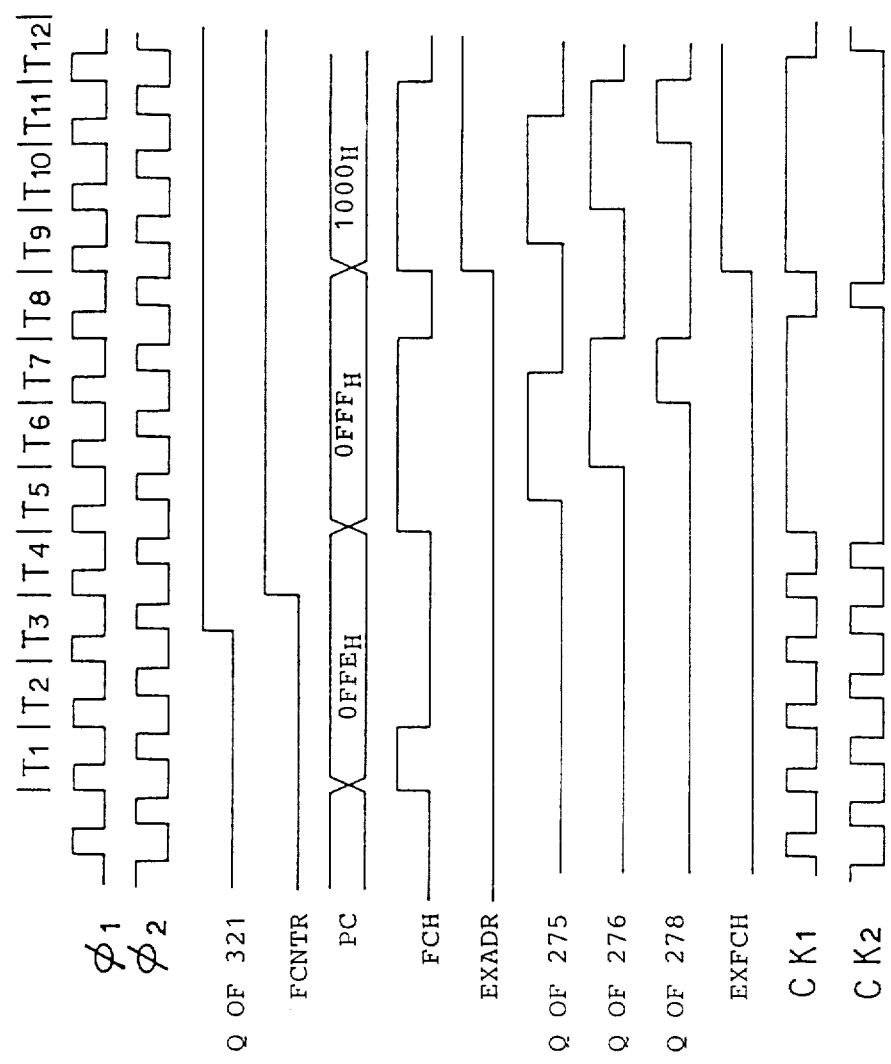
FIG. 8 is a timing chart illustrating the memory access timing of the computer shown in FIG. 4.

Next, operation of the timing controller 27 shown in FIG. 7 will be explained with reference to FIG. 8.

First, operation will be reviewed in the case of the FCNTR signal of "0". Assume that in a timing period $T_1$, the CPU 25 brings the instruction fetch control signal FCH to "1", and the program counter 22 is incremented by +1 to the content of "0FFE$_H$". The addresses "0000$_H$" to "0FFF$_H$" are assigned to the internal ROM 21. Therefore, the EXADR signal of "0" is then generated from the address discriminator 260, and so, the output of the OR circuit 270 is rendered "0", so that the output of the AND circuit 271 becomes "0". Accordingly, the EXFCH signal is maintained at "0".

In the timing period $T_3$, the CPU 25 executes a rewrite instruction of the control bit. For this purpose, the CPU 25 outputs "0" at the 0th bit of the internal data bus 31, and the address of the control bit generator 32 is outputted on the internal bus 30. As a result, the control bit address selection signal of "1" is generated, so that the AND gate 320 generates the output of "1" at the rising edge of the clock $\phi_2$. Namely, the latch 321 is set to "1".

Accordingly, in the timing period $T_4$, the latch 322 is set by the rising edge of the clock $\phi_1$, so as to generate the FCNTR signal of "1". In this condition, the FCH signal is rendered to "1" in the timing period $T_5$, and so, the program counter 22 is incremented to "0FFF$_H$". As seen from the above explanation, the address "0FFF$_H$" indicates the internal ROM. Therefore, in this condition, the output of the OR circuit 270 is brought to "1", and the output of the AND circuit 271 becomes "1". On the other hand, since the output of the inverter 282 is of "0" at this time, the output of the SR latch 275 is brought to "1" at the rising edge of the clock $\phi_2$. In addition, while the output of the AND circuit 271 is maintained at "1", the outputs of the OR circuit 283 and the AND circuit 284 are maintained at "1" and "0", respectively. Namely, the CPU clocks CK1 and CK2 are fixed to "1" and "0", respectively, so that the CPU 25 stops its operation. In addition, the EXFCH signal outputted from the AND circuit 281 is maintained at "0", the external bus interface 29 does not operate.

In the timing period $T_6$, the output of the latch 276 is rendered to "1" at the rising edge of the clock $\phi_1$. Since the output of the NOR circuit 286 is of "0" at this time, "1" is written to the latch 277 at the rising edge of the clock $\phi_2$. Therefore, the content of the latch 278 is rendered to "1" at the rising edge of the clock $\phi_1$ in the succeeding timing period $T_7$.

Thus, since the output of the AND circuit 273 and hence the output of the OR circuit 274 are brought to "1", the SR latch 275 is reset at the rising edge of the clock $\phi_2$ in the timing period $T_7$. On the other hand, the output of the NOR circuit 286 is brought to "0", so that the output of the AND circuit 280 is rendered to "0". Namely, the output of the latch 277 becomes "0" at the rising edge of the clock $\phi_2$.

Therefore, the outputs of the latches 276 and 278 are brought to "0" at the rising edge of the clock $\phi_1$ in the succeeding timing period $T_8$. In addition, the FCH signal is made "0".

As seen from the above, in the case that the FCNTR output of the control bit generator 32 is of "1", when an instruction is fetched from the internal ROM, the EXFCH signal is not outputted, but the instruction fetch operation is expanded to a length of three clock cycles, similarly to the external fetch cycle.

At the timing $T_8$, the output of the AND circuit 271 is rendered "0", so that the CPU clocks CK1 and CK2 are outputted in synchronism with the clocks $\phi_1$ and $\phi_2$. Namely, the CPU restarts to operate in the normal condition.

If the FCH signal is brought to "1" in synchronism with the clock $\phi_1$ in the timing period $T_9$, the program counter 22 is incremented by +1 and the content is changed to "1000$_H$". Since the address "1000$_H$" designates the external ROM, the address discriminator generates the EXADR signal of "1". Accordingly, the AND circuit 281 outputs the EXFCH signal of "1" which causes the external fetch cycle.

Operations during timing periods $T_9$ to $T_{11}$ are similar to those during the timing periods $T_5$ and $T_7$, and so, explanation will be omitted. Namely, the operation of fetching an instruction from the internal ROM under the FCNTR signal of "1" can be made similar to the operation of the external fetch cycle.

In addition, when the EA signal is of "1", the EXADR becomes "1" irrespectively of the address on the internal address bus 30 so that an operation similar to those performed during the timing periods $T_9$ to $T_{11}$. Namely, an external fetch cycle is caused. This means that an operation for fetching an instruction from any address in the internal ROM can be executed similarly to the external fetch cycle by applying the EA signal of "1".

As seen from the above, the microcomputers as mentioned above can access the associated internal memory at a high speed, and also can access the internal memory at a speed equal to that of the external memory access, so that the microcomputer can not only execute the high speed operation by effectively using the internal memory, but also execute the program in the internal memory with the same operation speed as used when the program is stored in the external memory.

The invention has thus been shown and described with reference to specific embodiments. However, it should be noted that the invention is in no way limited to the details of the illustrated structures but changes and modifications may be made within the scope of the appended claims.

We claim:

1. A microcomputer which includes an instruction execution unit and an internal memory formed on the same chip, comprising a first means for setting a memory access cycle for a read/write to the internal memory shorter than that for read/write to an external memory, a second means for setting the memory access cycle for the read/write to the internal memory substantially equal to that for the read/write to the external memory, and means for selectively activating one of the first and second setting means.

2. A microcomputer as claimed in claim 1 wherein the first means includes a first circuit generating a first memory access timing signal having a length shorter than the memory access cycle for the external memory, and the second means includes a second circuit generating a second memory access timing signal having a length substantially equal to the memory access cycle for the external memory.

3. A microcomputer as claimed in claim 2 further including an address discriminator adapted to discriminate whether an address to be accessed designates the internal memory or the external memory, the discriminator operating to activate the first means when the address to be accessed designates the internal memory and to activate the second means when the address to be accessed designates the external memory.

4. A microcomputer as claimed in claim 3 further including a third means responsive to a mode setting signal to cause the selective activating means to activate the second means irrespectively of whether the address to be accessed designates the internal memory.

5. A microcomputer as claimed in claim 3 wherein the address discriminator includes an OR circuit receiving at least the most significant bit of a address information on an internal address bus in the microcomputer.

6. A microcomputer as claimed in claim 5 wherein the OR circuit also receives the mode setting signal.

7. A microcomputer as claimed in claim 1 further including a third means responsive to a mode setting signal to cause the selective activating means to activate the second means irrespectively of whether the address to be accessed designates the internal memory.

8. A microcomputer as claimed in claim 1 further including a timing controller, comprising said first means and said second means, said controller being operative to receive an address output timing signal for generating a data read/write timing signal, to terminate the read/write timing signal at only one clock cycle when the address to be accessed designates the internal memory, and to expand the read/write timing signal to a length of a plurality of clock cycles when the address to be accessed designates the external memory.

9. A microcomputer as claimed in claim 8 wherein the timing controller has a pair of feedback paths for returning the read/write timing signal to an initial condition when the read/write timing signal has changed, one of the feedback paths having a delay time shorter than that of the other feedback path, the one feedback path being activated when the address to be accessed designates the internal memory, and the other feedback path being activated when the address to be accessed designates the external memory.

10. A microcomputer as claimed in claim 9 wherein the other feedback path is activated and the one feedback path is cut off when it is required to make the access time of the internal memory consistent with that of the external memory.

11. A microcomputer as claimed in claim 1 wherein the instruction execution unit includes a CPU, and further including a timing controller receiving at least an address discrimination signal indicative of whether or not an address to be accessed indicates the external memory, an instruction fetch control signal, and a pair of clock signals, the timing controller generating at least an external memory fetch signal and a pair of CPU clock signals to the CPU, the timing controller being controlled to maintain the CPU clocks at fixed condition for a predetermined time length independently of the clock signals when an address to be accessed designates the external memory.

* * * * *